April 9, 1963  W. A. HAMES, JR., ETAL  3,084,522
REVERSE AIR CYCLE AIR CONDITIONER
Filed June 1, 1960  4 Sheets-Sheet 3
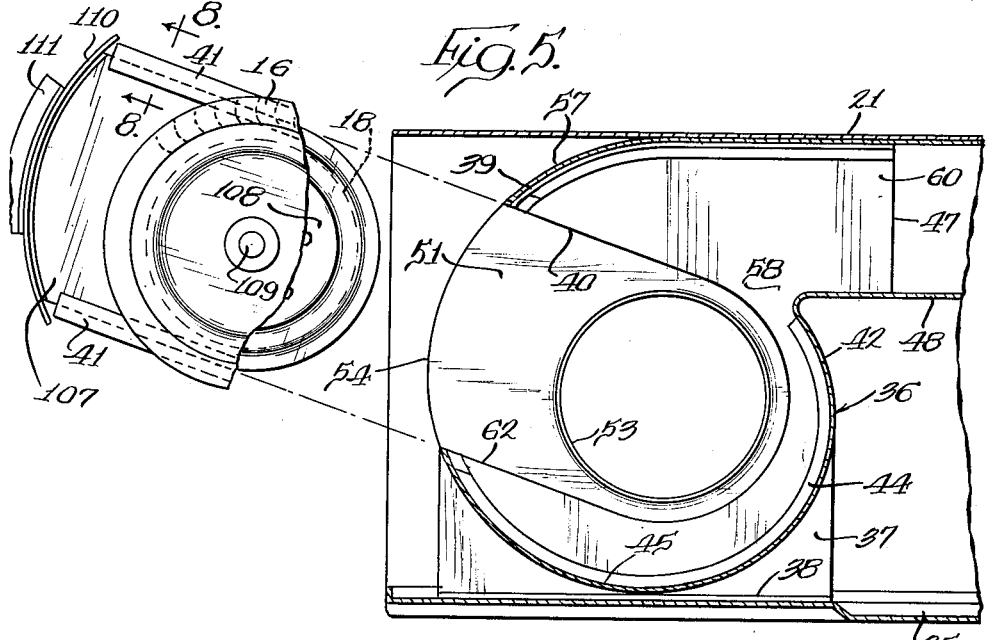
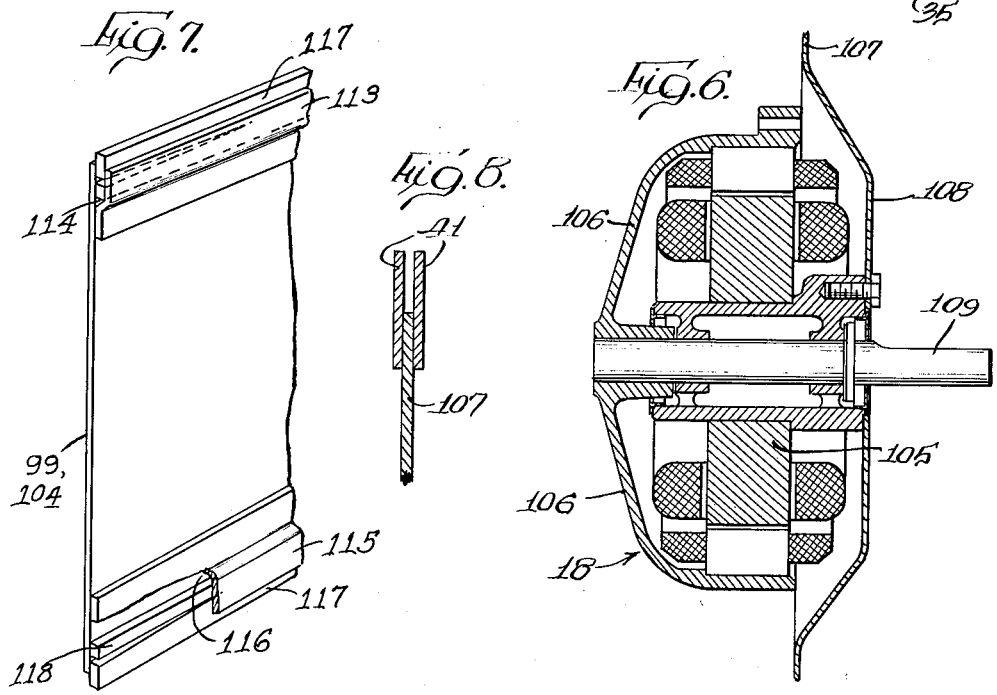
INVENTORS:
William A. Hames, Jr.
Luther J. Jungemann
George W. Sisk, Jr.
By Hofgren, Brady, Wegner,
Allen & Stellman
Attys

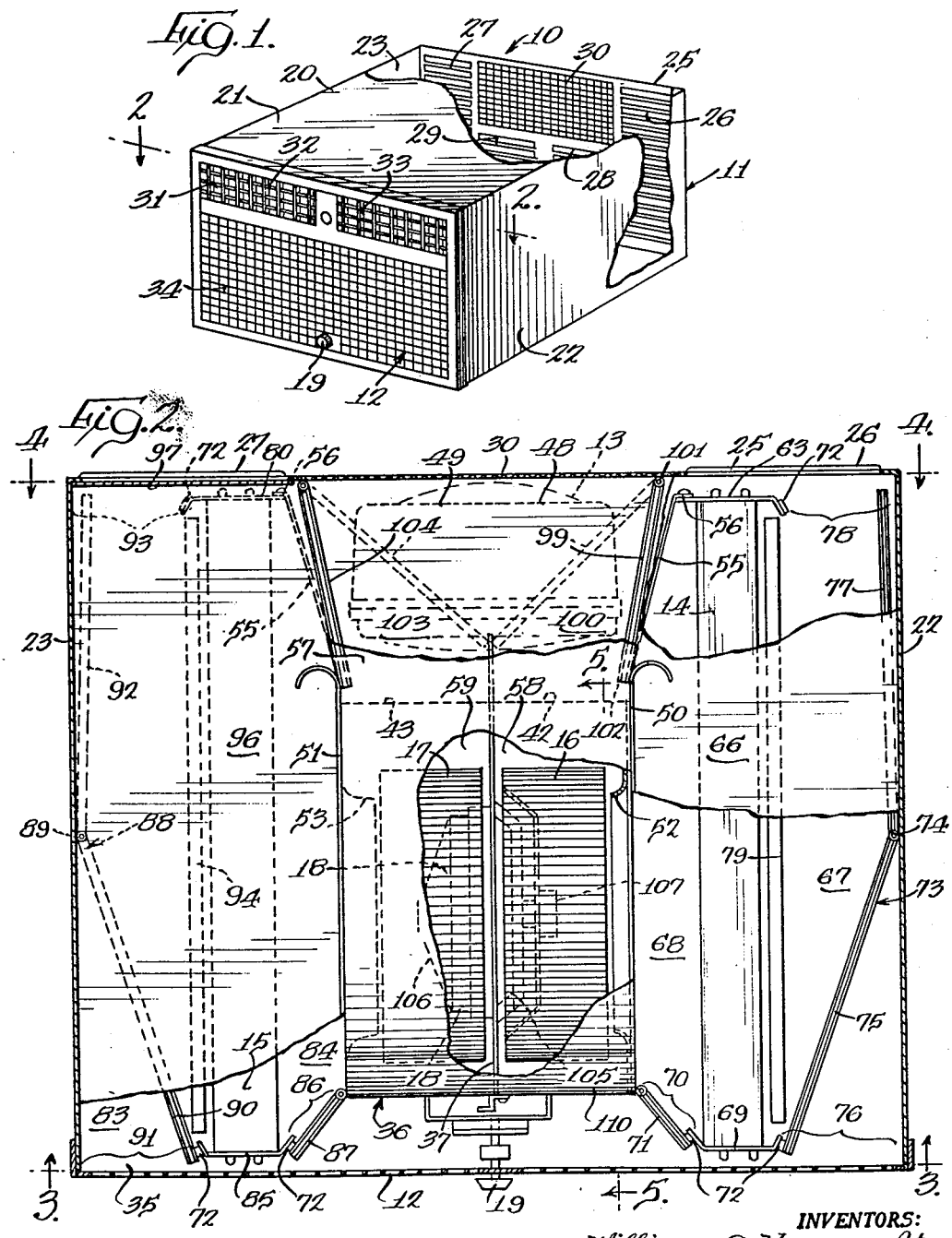

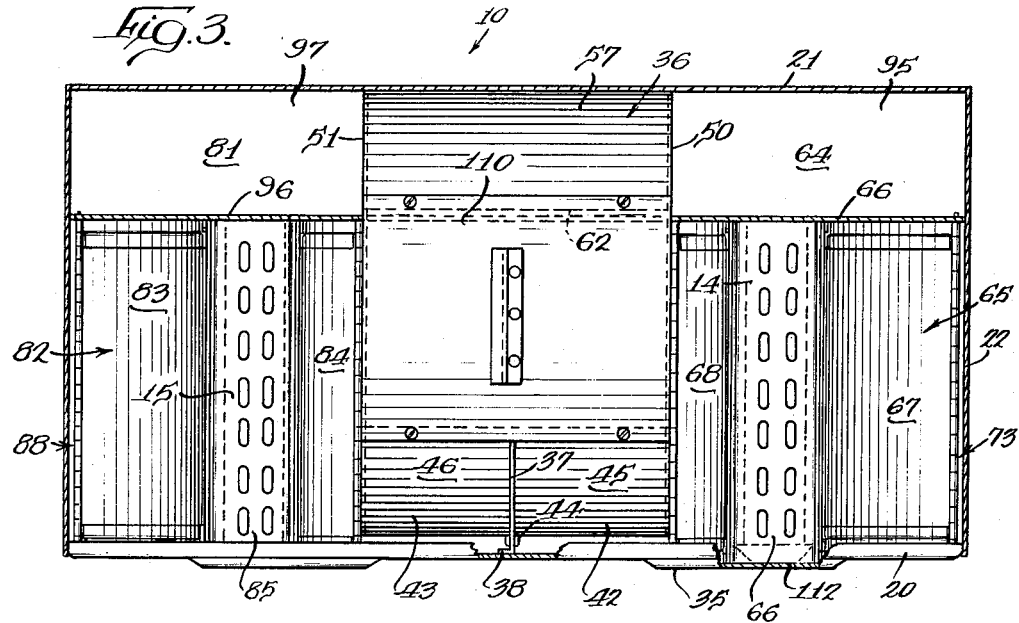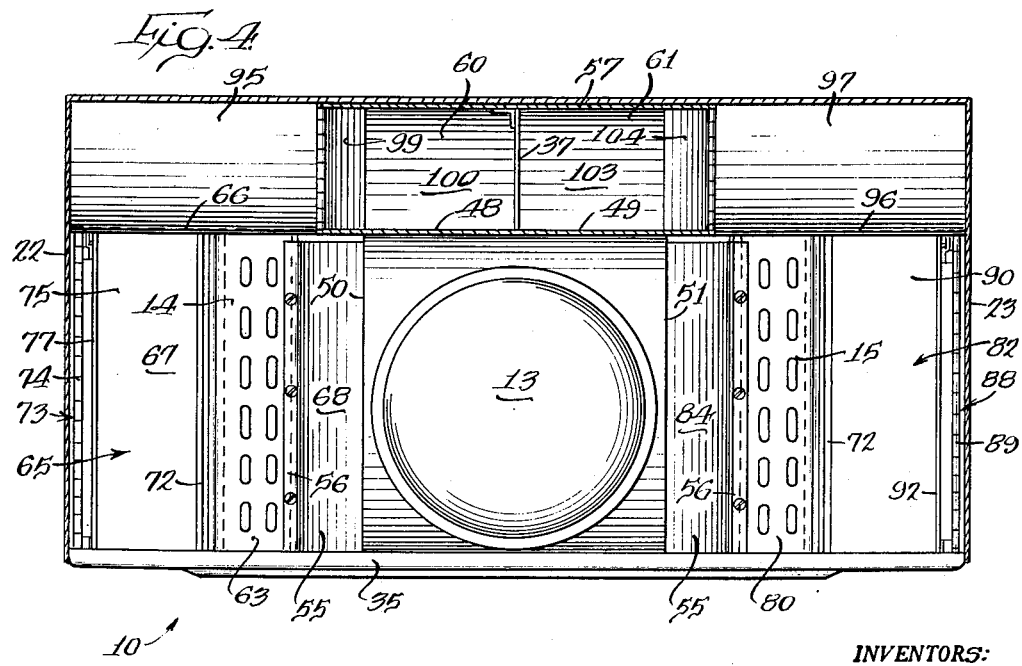

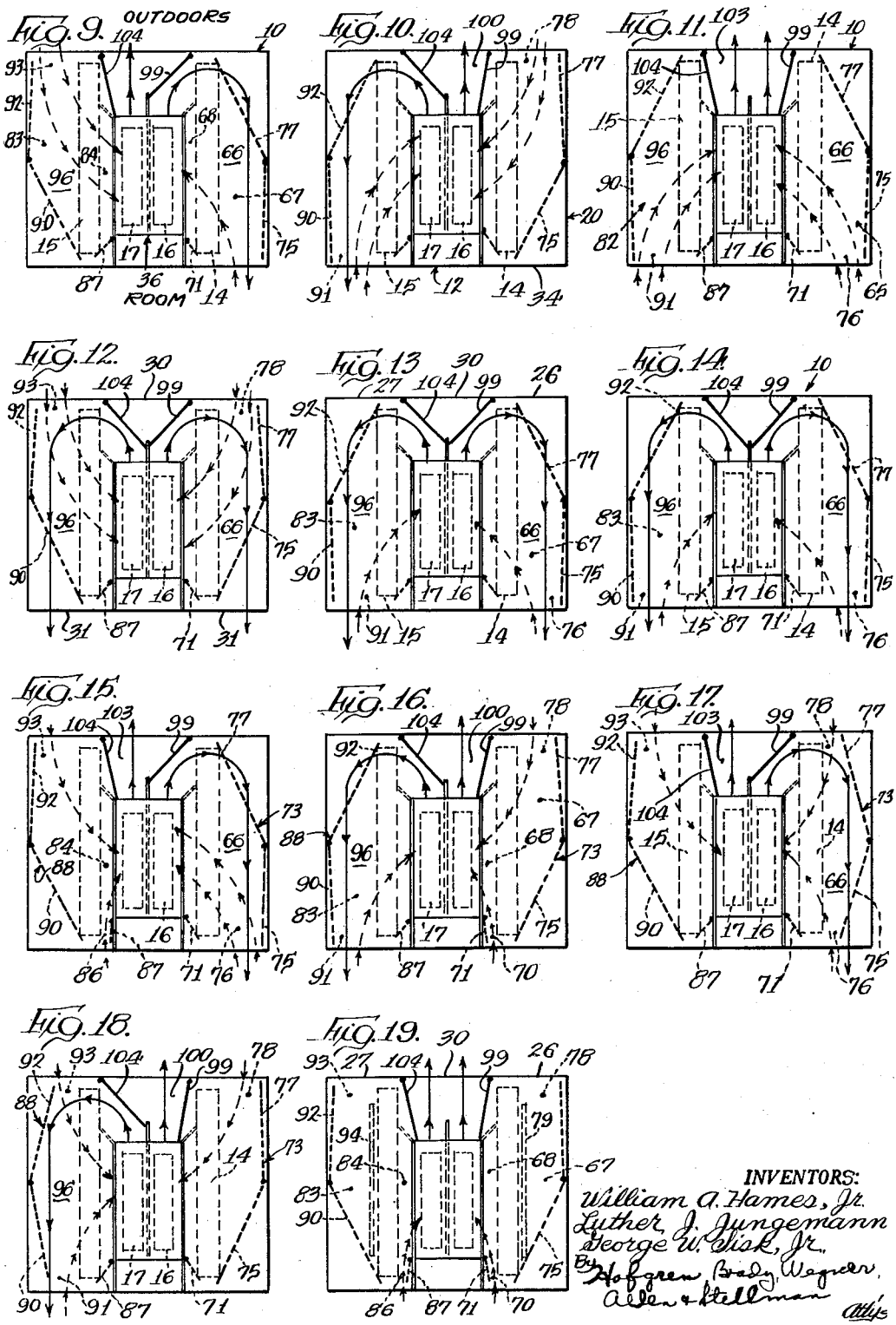

United States Patent Office 3,084,522
Patented Apr. 9, 1963

3,084,522
REVERSE AIR CYCLE AIR CONDITIONER
William A. Hames, Jr., Luther J. Jungemann, and George W. Sisk, Jr., Evansville, Ind., assignors to Whirlpool Corporation, a corporation of Delaware
Filed June 1, 1960, Ser. No. 33,290
6 Claims. (Cl. 62—262)

This invention relates to air conditioning apparatus and more particularly to reverse air cycle, window installed types of air conditioners.

Because of the limited dimensions of the conventional home windows, it has heretofore been necessary to omit a number of desirable functions in the known types of reverse air cycle air conditioners arranged for installation therein as it has not been practicable to provide all of the necessary apparatus in the limited allowed space. The present invention comprehends an improved structural arrangement and design providing at least 11 desirable air conditioning operations in such an air conditioning apparatus while maintaining the apparatus sufficiently compact to permit ready installation in the conventional home type window.

A principal feature of the invention is, therefore, the provision of a new and improved air conditioning apparatus.

Another feature is the provision of such an apparatus having an improved arrangement of air flow passages and chambers and associated flow directing means providing a substantial number of air conditioning functions in an improved, simplified and economical manner.

A further feature of the invention is the provision of such an air conditioning apparatus having new and improved air moving means providing improved facility in assembly and maintenance.

Still another feature is the provision of new and improved air moving means for use in air conditioning apparatus, said air moving means having an improved, compact, highly efficient structure.

Other features and advantages of the invention will be apparent from the following description, taken in connection with the accompanying drawings wherein:

FIGURE 1 is a perspective of an air conditioning apparatus embodying the invention with portions thereof broken away.

FIGURE 2 is a horizontal section thereof taken substantially along the line 2—2 of FIGURE 1.

FIGURE 3 is a vertical section thereof taken substantially along the line 3—3 of FIGURE 2.

FIGURE 4 is a vertical section thereof taken substantially along the line 4—4 of FIGURE 2.

FIGURE 5 is a fragmentary vertical section taken substantially along the line 5—5 of FIGURE 2, illustrating the air moving apparatus in a speced relationship with the means defining the blower chamber.

FIGURE 6 is a diametric section of the motor of the air moving apparatus.

FIGURE 7 is a fragmentary perspective of a door for controlling air flow through the outlet chamber.

FIGURE 8 is a section of the slide plate taken substantially along the line 8—8 of FIGURE 5.

FIGURES 9 through 19 are schematic representations of the air conditioning apparatus illustrating eleven different air conditioning functions provided by the air conditioning apparatus.

In the exemplary embodiment of the invention as disclosed in the drawings, an air conditioning apparatus generally designated 10 comprises an outer housing, or case, 11 having a removable front panel 12. Mounted within case 11 are means defining a refrigeration system including a compressor 13, an evaporator 14, and a condenser 15; air moving means including a pair of blowers 16 and 17 and a drive motor 18; and air flow directing means for directing air through the apparatus selectively in any one of a plurality of different manners, as will be brought out more fully subsequently. The operation of the air conditioning apparatus is controlled by a single knob 19 accessible at the front of panel 12, which when the air conditioning apparatus is installed in a conventional window confronts the room interior.

As best seen in FIGURE 1, case 11 includes an inverted U-shaped wrapper 20 defining a top 21 and opposite sides 22 and 23. The rear of the case 11 is defined by a panel 25 secured to top 21 and sides 22 and 23 of wrapper 20 as by spot welding. Panel 25 includes two outer rows 26 and 27 of vertically spaced louvers extending the full height of the panel, and two inner rows 28 and 29 of vertically spaced louvers terminating at a line spaced substantially below the top of the panel. Directly above louvers 28 and 29, the panel is provided with a screened opening 30.

Front panel 12 is preferably decorative and may be molded of a suitable plastic. In its upper portion, front panel 12 is provided with a discharge opening 31 horizontally across which extends a plurality of adjustable, interconnected horizontal louvers 32, and vertically across which extends a plurality of interconnected, adjustable vertical louvers 33 to direct air leaving the air conditioning apparatus as desired. The lower portion of panel 12 defines a plurality of quadrangular openings 34. The apparatus within case 11 is carried on a heavy gauge galvanized steel base pan 35. Compressor 13 is resiliently secured directly to the base pan substantially midway between wrapper sides 22 and 23 and adjacent rear panel 25 in front of louver rows 28 and 29.

A scroll assembly 36 is secured to base pan 35 immediately in front of compressor 13 and substantially midway between wrapper sides 22 and 23. The scroll assembly includes a center dividing wall 37 which may be formed of flat sheet metal. The lower edge 38 thereof is turned to define a right angle flange which is secured to base pan 35. As best seen in FIGURE 5, the front edge 39 of the dividing wall 37 is circular and is provided with a large U-shaped recess 40 having its axis inclined downwardly toward the rear of the wall.

The bottom of scroll assembly 36 is defined by a pair of bottom walls 42 and 43 provided with downturned flanges 44 secured to the dividing wall 37. Bottom walls 42 and 43 include segmentally cylindrical forward portions 45 and 46 respectively extending rearwardly from the lower forward end of recess 40 to a vertical plane 47 perpendicular to dividing wall 37 at the front end of compressor 13. A flat portion 48 of bottom wall 42, and a flat portion 49 of bottom wall 43 extend rearwardly from plane 47 to define horizontal walls terminating at rear panel 25.

Scroll assembly 36 further includes a pair of side plates 50 and 51 secured as by spot welding to scroll bottom walls 42 and 43. An opening 52 in side plate 50 and a corresponding opening 53 in side plate 51 are defined by inwardly extruded edges to provide a non-turbulent air flow into the scroll assembly. The forward edges 54 of the side plates are circular corresponding to the cylindrical configuration of the scroll bottom walls 42 and 43 and the portions 55 of the side plates extending rearwardly from plane 47 are curved outwardly to terminate in a right angle flange 56.

The top of the scroll assembly 36 is defined by a top plate 57 secured to dividing wall 37 and to each of side plates 50 and 51. Top plate 57 extends rearwardly from the forward upper end of recess 40 to adjacent rear panel 25.

Thus, scroll assembly 36 defines a pair of blower chambers 58 and 59 on opposite sides of dividing wall 37. Opening 52 in side plate 50 defines an inlet to a blower chamber 58 and opening 53 in side plate 51 defines an inlet to blower chamber 59. An outlet 60 of chamber 58 is defined by dividing wall 37, flat portion 48 of bottom wall 42, side plate 50 and top wall 57 at plane 47; and a corresponding outlet 61 from chamber 59 is defined by dividing wall 37, flat portion 49 of bottom wall 43, side plate 51, and top wall 57 at plane 47. The front of the scroll assembly 36 is provided with an opening 62 defined by top plate 57, side plate 51, bottom walls 43 and 42, and side plate 50.

As best seen in FIGURE 2, evaporator 14 is secured to flange 56 to extend substantially between front panel 12 and rear panel 25 parallel to and spaced outwardly from scroll assembly side plate 50. The evaporator includes a rear end plate 63 secured to side plate flange 56 of side wall 50. As best seen in FIGURE 3, the portion of the interior of case 11 to the right of scroll assembly 36 is divided into an upper chamber 64 and a lower chamber 65 by a horizontal dividing wall 66 to which the top of evaporator 14 is secured. The lower chamber 65 is effectively divided into a pair of spaces 67 and 68 by the evaporator 14. The evaporator is further provided with a front end plate 69 which defines with scroll assembly side plate 50 an opening 70 providing for air flow through front panel 12 into space 68. Opening 70 is controlled by a bypass door 71 pivotally mounted on side plate 50 and cooperating with a gasket 72 on evaporator end plate 69 to close sealingly the opening 70.

Air may pass into space 67 either through louvers 26 of rear panel 25 or openings 34 of panel 12, such air flow being controlled by a damper 73 pivotally mounted at its mid-portion 74 on wrapper side portions 22. Damper 73 includes a first door portion 75 extending from mid-portion 74 forwardly to engage sealingly a gasket 72 on evaporator front plate 69. Damper 73 further includes a second door portion 77 extending rearwardly from mid-portion 74 to engage sealingly a gasket 72 on evaporator rear plate 63. The door portions 75 and 77 are angularly related so that when one door portion is in sealing engagement with its corresponding gasket, the other door portion will lie in juxtaposition to wrapper side portion 22 providing substantially unrestricted air flow through the selected inlet to space 67, namely the forward inlet 76 defined by base pan 35, wrapper side portion 22, horizontal dividing wall 66, and front plate 69, and the rear inlet 78 defined by base pan 35, wrapper side portion 22, horizontal dividing wall 66, and rear plate 63. Gaskets 72 may comprise strips of magnetized gasket material for improved sealing engagement of the damper doors therewith.

A conventional air filter 79 may be provided in space 67 in facial juxtaposition to evaporator 14.

As shown in FIGURE 2, condenser 15 is secured to flange 56 to extend substantially between front panel 12 and rear panel 25 parallel to and spaced outwardly (to the left as seen in FIGURE 2) from scroll assembly side plate 51. The condenser includes a rear end plate 80 secured to flange 56 of the side plate 51. As best seen in FIGURE 3, the portion of the interior of case 11 to the left of scroll assembly 36 is divided into an upper chamber 81 and a lower chamber 82 by a horizontal dividing wall 96 to which the top of condenser 15 is secured. The lower chamber 82 is effectively divided into a pair of spaces 83 and 84 by the condenser 15. The condenser is further provided with a front end plate 85 which defines with scroll assembly side plate 51 an opening 86 providing for air flow through front panel 12 into space 84. Opening 86 is controlled by a bypass door 87 pivotally mounted on side plate 51 and cooperating with a gasket 72 on condenser end plate 85 to close sealingly the opening 86.

Air may pass into space 83 either through louvers 27 of rear panel 25 or openings 34 of panel 12, such air flow being controlled by a damper 88 pivotally mounted at its mid-portion 89 on wrapper side portion 23. Damper 88 includes a first door portion 90 extending from mid-portion 89 forwardly to engage sealingly a gasket 72 on condenser front plate 85. Damper 88 further includes a second door portion 92 extending rearwardly from mid-portion 89 to engage sealingly a gasket 72 on condenser rear plate 80. The door portions 90 and 92 are angularly related so that when one door portion is in sealing engagement with its corresponding gasket, the other door portion will lie in juxtaposition to wrappeer side portion 23 providing substantially unrestricted air flow through the selected inlet to space 83, namely the forward inlet opening 91 defined by base pan 35, wrapper side portion 23, horizontal dividing wall 96, and end plate 85, or the rear inlet opening 93 defined by base pan 35, wrapper side portion 23, horizontal dividing wall 96, and end plate 80. A conventional air filter 94 similar to air filter 79 may be provided in space 83 in facial juxtaposition to condenser 15.

As best seen in FIGURE 3, horizontal dividing wall 66 includes an upstanding portion 95 defining a rear wall extending in facial juxtaposition to rear panel 25 and defining the rear wall of chamber 64. The right side of the chamber 64 is defined by wrapper side 22 and the left side of chamber 64 is defined by side plate 50. Horizontal dividing wall 96 is similarly provided with an upstanding rear portion 97 defining a rear wall extending in facial juxtaposition to rear panel 25 and defining the rear wall of chamber 81. The left side of chamber 81 is defined by wrapper side 23 and the right side of chamber 81 is defined by side plate 51.

Air passing from blower chamber 58 through outlet 60 thereof is directed by a damper door 99 selectively directly through an outlet space 100 to pass outwardly from the air conditioning apparatus 10 through screened opening 30, or into chamber 64 to pass therethrough and outwardly from the air conditioning apparatus through louvered opening 31 in front panel 12. As shown, damper door 99 comprises a flat sheet metal member extending vertically substantially between scroll assembly bottom wall portion 48 and top wall 57. The door 99 is pivotally mounted on a suitable hinge 101 to be positively positioned in either of the above discussed positions, the first position being shown in full lines and indicating the engagement of the free end 102 of the door 99 with the scroll assembly side plate 50, and the other arrangement being shown in dotted lines and indicating the engagement of the end 102 with the dividing wall 37 of the scroll assembly.

Similarly, air passes from outlet 61 of blower chamber 59 through a space 103 selectively by means of a damper door 104 similar to damper door 99, directly to screened opening 30 or to chamber 81 to pass through opening 31 in front panel 12.

A preferred seal construction for sealing the damper doors 99 and 104 to wall portion 48 and wall 57 is shown in FIGURE 7. A Z-shaped strip 113 is secured as by spot welding along the top of the door to define with the door top an upwardly opening channel 114, and a similar strip 115 is secured to the bottom of the door to define with the door bottom a downwardly opening channel 116. A sealing strip 117 formed of a material such as polystyrene plastic is disposed in each channel to project therefrom into sealing engagement with the confronting wall surfaces. Each strip is provided with spring finger portions 118 at the opposite ends thereof for biasing the strip outwardly of the channel and assuring effective sealing of the door to the wall surfaces notwithstanding irregularities therein.

Thus, air conditioning apparatus 10 effectively comprises a pair of generally allochiral portions about the plane of dividing wall 37. Each portion includes a blower chamber, e.g., blower chamber 58, having an inlet, e.g., opening 52, and an outlet, e.g., outlet 60; an inlet chamber, e.g. chamber 65, having first, second and third inlet openings, e.g. openings 76, 78 and 70, and an outlet opening, e.g. opening 52, communicating with the inlet of the blower chamber; a heat exchanger, e.g., evaporator 14 extending across the inlet chamber and dividing the inlet chamber into an outer space, e.g., space 67, having direct communication with the first and second openings, e.g., openings 76 and 78, and an outer side of the heat exchanger only, and an inner space, e.g., space 68, having direct communication with the third inlet opening, e.g., opening 70, the blower chamber inlet, and the inner side of the heat exchanger only; and an outlet chamber, e.g., chamber 64 and space 100, having a pair of outlet ports, e.g., openings 31 defining the outlet from chamber 64 and screened opening 30 defining the outlet from space 100. An air moving means, e.g., blower 16, is disposed in the blower chamber for moving air through the air conditioning apparatus. The apparatus further includes a first flow control means, e.g., damper 73, for directing the moving air selectively through the first and second inlet openings to the outer space; second flow control means, e.g., door 71, for directing air selectively through the third inlet opening to the inner space; and third flow control means, e.g., damper 99, for directing air from the blower chamber outlet selectively through the outlet openings of the apparatus, e.g., openings 30 and 31.

To minimize effectively the width of air conditioning apparatus 10, drive motor 18 is disposed within blower 17 and arranged so that the stator portion 105 comprises the inner portion of the motor and the outer housing portion 106 comprises the rotating portion or rotor of the motor. As best seen in FIGURES 2, 5 and 6, outer portion 106 includes an axial portion 109 defining a shaft extending to within blower 16 and, thus, provides a radially inner drive of each of the blowers 16 and 17.

Motor 18 is mounted on a slide plate 107 having a configuration similar to that of dividing wall recess 40. As best seen in FIGURES 5 and 7, a pair of U-shaped sheet metal guide strips 41 are secured as by spot welding to opposite sides of the top and bottom edges of slide plate 107 to overlie the periphery and define a U-shaped track. Thus, when the slide plate 107 is installed within the scroll assembly 36, the periphery of recess 40 of dividing wall 38 is engaged by the U-shaped track on the slide plate. As shown in FIGURE 6, motor stator 105 is secured to a dished portion 108 of the slide 107, shaft 109 extending through the slide for driving blower wheel 16. The forward end of slide 107 is provided with a turned flange to which is secured, as by spot welding, a cover 110 curved in conformity with side plate edge 54. As best seen in FIGURE 3, the cover is slightly larger than opening 62 to completely seal the front opening of the scroll assembly 36. A handle 111 may be provided on the cover 110 for facilitated manipulation. As the motor and blower 16 and 17 may be assembled in association with slide 107 prior to the installation thereof in recess 40, facilitated alignment and balancing of the moving parts may be effected prior to the installation within the scroll assembly 36. Maintenance thereof is similarly facilitated as the assembly may be removed as a unit at any time as desired.

Condensate from evaporator 14 may be collected in a condensate pan 112 carried on base pan 35 directly below the evaporator. The collected water may be drained to the vicinity of the condenser 15 or may be discharged to outside the air conditioning apparatus 10 as desired.

As indicated briefly above, air conditioning apparatus 10 provides a unit having effectively maximized compactness a large number of air conditioning operations. Eleven such operations are illustrated in FIGURES 9 through 19. Turning first to FIGURE 9, an arrangement of apparatus 10 providing a room cooling operation is illustrated. In this arrangement, the room air is drawn through front panel openings 34, through inlet chamber openings 76, through evaporator 14, and through space 68 to blower 16. Damper 99 directs air from blower 16 through space 100, to outlet chamber 64 from which it passes through front panel openings 31 back to the room space. Outside air is drawn through louvers 27 into chamber 82 wherein it passes through condenser 15 and space 84 to blower 17, which discharges it through space 103 and screened opening 30 to the outdoors. The refrigeration system including compressor 13, evaporator 14, and condenser 15 are operated during this operation, cooling the air returned to the room space and transferring heat to the air passed through condenser 15 and discharged to the outside.

FIGURE 10 illustrates an arrangement of apparatus 10 for heating a room space. In this arrangement, damper door 90 is positioned to open opening 91 permitting blower 17 to draw air through front panel openings 34 and condenser 15 wherein this air is heated. Damper door 104 is positioned to direct the air from blower 17 through space 103 to chamber 81 and thence through openings 31 back to the room space. At the same time, damper door 75 is positioned to open inlet opening 78 permitting blower 16 to draw air in from the outside through evaporator 14. Damper door 99 is positioned to direct the air flow from blower 16 through space 100 and outwardly to the outside through screened opening 30.

FIGURE 11 illustrates an arrangement of the apparatus 10 for exhausting room air to the outdoors. In this arrangement, damper doors 75 and 90 are positioned to open openings 76 and 91 respectively and doors 99 and 104 are positioned to direct air from blowers 16 and 17 respectively through screened opening 30 to the outdoors. Thus, the blowers draw the room air through both inlet chambers 65 and 82 and discharge this air directly to the outdoors through the rear of the apparatus. During this operation, the compressor, evaporator and condenser do not function.

In FIGURE 12, apparatus 10 is shown as arranged to provide fresh outdoor air to the room space. In this arrangement, damper doors 77 and 92 are positioned to permit air flow from the outdoors through openings 78 and 93 respectively to blowers 16 and 17. The damper doors 99 and 104 are positioned to direct the air from the blowers through the openings 31 in the front panel into the room space. During this operation, the compressor, evaporator and condenser do not function.

In FIGURE 13, the air conditioning apparatus is shown as arranged to provide dehumidification of the room air. In this arrangement, door 75 is arranged to permit air flow through opening 76 and evaporator 14 to blower 16, and door 90 is arranged to permit air flow through opening 91 and condenser 15 to blower 17. The refrigeration system is operated at this time so that moisture in the air passing through evaporator 14 is deposited on the evaporator thereby reducing the humidity of this air. The air passing through condenser 15 is warmed as it passes therethrough. Doors 99 and 104 are arranged to conduct the air from blowers 16 and 17 outwardly through the front openings 31. The warm air delivered from blower 17 mixes with the dehumidified cooled air delivered from blower 16 in the room space adjacent the air conditioning and, thus, the resultant air delivery is one having a slightly higher temperature than the air entering the air conditioning apparatus but having reduced moisture content.

In FIGURE 14, an arrangement of the air conditioning apparatus for recirculation of the room air without affecting the temperature or humidity thereof is illustrated. In this arrangement, the air flow through the air conditioning apparatus 10 is identical to the air flow as illustrated in FIGURE 13. However, in this arrangement, the compressor, evaporator and condenser are inoperative, and thus the apparatus functions as a conventional fan.

FIGURE 15 shows an arrangement of apparatus 10 providing cooling the room space air while concurrently exhausting a portion thereof to the outside. The apparatus is arranged generally similarly to the arrangement shown in FIGURE 9 except that door 87 is positioned to permit air flow through opening 86 to space 84, from which space this air together with the outside air drawn through opening 93 by blower 17 is drawn by the blower and discharged to the outside through rear opening 30 of the apparatus. The air translated by blower 16 is cooled by its passage through evaporator 14 to provide the desired cooling of the room air.

In FIGURE 16 is illustrated an arrangement of the air conditioning apparatus for heating the room air while concurrently exhausting a portion of the room air to the outside. Thus, the arrangement of FIGURE 16 is generally similar to that of FIGUURE 10, except that door 71 is positioned to permit a limited flow of room air through opening 70 to space 68, from which space this air is drawn by blower 16 together with air passing through opening 78 to be discharged through opening 30 to the outside.

It should be noted that the same functions of apparatus 10 as illustrated in FIGURES 15 and 16 may be obtained without the provision of openings 86 and 70, by merely arranging the dampers 88 and 73 selectively in an intermediate position wherein the front inlet and rear inlet controlled by the selected door are concurrently partially opened. FIGURES 17 and 18 illustrate other functions of the apparatus 10 obtained by such intermediate positioning of the dampers 88 and 73.

More specifically, FIGURE 17 illustrates an arrangement of the air conditioning apparatus wherein the room air is cooled and concurrently fresh air is delivered to the room space from the outside. In this arrangement, the damper 73 is disposed in an intermediate position wherein each of inlets 76 and 78 are partially open permitting blower 16 to draw air through evaporator 14 from both the room space and the outside. This air is directed from blower 16 by door 99 to pass into the room space through front openings 31.

The arrangement illustrated in FIGURE 18 is reversely similar to that of FIGURE 17 in that outside air is delivered to the room space during a heating of the room space air. Thus, in the arrangement of FIGURE 18, the damper 88 is arranged to permit each of inlets 91 and 93 to be partially open and door 104 is positioned to direct the air from blower 17 into the room space through openings 31.

At certain times, such as when the room air is extremely dense or smoke laden, it is desirable to exhaust the room air to the outside without passing it through the filters 79 and 94. The arrangement of air conditioning apparatus 10 to permit such functioning is shown in FIGURE 19 wherein each of doors 71 and 87 is positioned to permit air flow through openings 70 and 86 to blowers 16 and 17 respectively while doors 75 and 90 are positioned to close openings 76 and 91 respectively. Doors 99 and 104 are arranged to pass the air from blowers 16 and 17 through screened opening 30 to the outside. During this operation, the compressor, evaporator and condenser are inoperative.

Having described our invention as related to the embodiment shown in the accompanying drawings, it is our intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. Air conditioning apparatus, comprising: means defining a blower chamber having an inlet and an outlet; means defining an inlet chamber having first, second and third inlet openings, and an outlet opening communicating with the inlet of the blower chamber; a heat exchanger extending across the inlet chamber dividing the inlet chamber into an outer space having direct communication with said first and second inlet openings and an outer side of the heat exchanger only, and an inner space having direct communication with said third inlet opening, said blower chamber inlet, and the inner side of the heat exchanger only, said heat exchanger permitting air to flow in heat exchange relationship therethrough between said spaces; means defining an outlet chamber having a pair of outlet ports, and an inlet port communicating with the blower chamber outlet; air moving means in said blower chamber for moving air inwardly through said inlet chamber and outwardly through said outlet chamber; first flow control means for directing the moving air selectively through said first and second inlet openings to said outer space; second flow control means for directing air selectively through said third inlet opening to said inner space; and third flow control means for directing air from said blower chamber outlet selectively through said outlet ports.

2. Air conditioning apparatus comprising: means defining a blower chamber having an inlet and an outlet; means defining an inlet chamber having first and second inlet openings, and an outlet opening communicating with the inlet of the blower chamber; a heat exchanger extending across the inlet chamber dividing the inlet chamber into an outer space having direct communication with said first and second inlet openings and an outer side of the heat exchanger only, and an inner space having direct communication with said blower chamber inlet and the inner side of the heat exchanger only, said heat exchanger permitting air to flow in heat exchange relationship therethrough between said spaces; means defining an outlet chamber having a pair of outlet ports, and an inlet port communicating with the blower chamber outlet; air moving means in said blower chamber for moving air inwardly through said inlet chamber and outwardly through said outlet chamber; first flow control means for directing the moving air selectively through said first and second inlet openings to said outer space; second flow control means for directing air from said blower chamber outlet selectively through said outlet ports; and means selectively operable to pass air directly to said inner space thereby bypassing said heat exchanger.

3. In an air conditioning apparatus, air moving apparatus, comprising: means defining a blower chamber having an inlet, an outlet, an access opening and a side wall having a recess defined by a pair of spaced edges extending from said access opening; air moving means; a panel carrying said air moving means for insertion and removal through said access opening and having edges complementary to said edges of the side wall opening; and guide means on one of said side wall and panel adjacent the edges thereof defining a channel for slidably receiving the edges of the other of said side wall and panel to support removably the panel on the side wall in said blower chamber and permit the air moving means on said panel to be installed in and removed as a unit from the blower chamber.

4. The air moving apparatus of claim 3 wherein a cover member is secured to said panel to extend across said access opening and close the same when the air moving means on said panel is installed in the blower chamber.

5. Air conditioning apparatus comprising: means defining a blower chamber having an inlet and an outlet; means defining an inlet chamber having first and second inlet openings, and an outlet opening communicating with the inlet of the blower chamber; a heat exchanger extending across the inlet chamber dividing the inlet chamber into an outer space having direct communication with said first and second inlet openings and an outer side of the heat exchanger only, and an inner space having direct communication with said blower chamber inlet and the inner side of the heat exchanger only, said heat exchanger permitting air to flow in heat exchange relationship therethrough between said spaces; means defining an outlet chamber having a pair of outlet ports, and an inlet port communicating with the blower chamber outlet; air moving means in said blower chamber for moving air inwardly through said inlet chamber and outwardly through said outlet chamber; first flow control means for directing the moving air selectively through said first and second inlet openings to said outer space; and second flow control means for directing air from said blower chamber outlet selectively through said outlet ports, the inlet openings of the inlet chamber being at a vertical level different from that of the outlet ports of the outlet chamber whereby the width of the apparatus is effectively minimized.

6. Air conditioning apparatus comprising: means defining a blower chamber having an inlet and an outlet; means defining an inlet chamber having first and second inlet openings, and an outlet opening communicating with the inlet of the blower chamber; a heat exchanger extending across the inlet chamber dividing the inlet chamber into an outer space having direct communication with said first and second inlet openings and an outer side of the heat exchanger only, and an inner space having direct communication with said blower chamber inlet and the inner side of the heat exchanger only, said heat exchanger permitting air to flow in heat exchange relationship therethrough between said spaces; means defining an outlet chamber having a pair of outlet ports, and an inlet port communicating with the blower chamber outlet; air moving means in said blower chamber for moving air inwardly through said inlet chamber and outwardly through said outlet chamber; first flow control means for directing the moving air selectively through said first and second inlet openings to said outer space; second flow control means for directing air from said blower chamber outlet selectively through said outlet ports, the inlet openings being horizontally related, and said first control means comprising a door; and means for pivoting the door about a vertical axis in said inlet chamber to close selectively the inlet openings.

References Cited in the file of this patent
UNITED STATES PATENTS

| | | |
|---|---|---|
| 1,548,769 | Thompson | Aug. 4, 1925 |
| 1,699,611 | Dennis | Jan. 22, 1929 |
| 2,466,383 | Cody | Apr. 5, 1949 |
| 2,776,088 | Wentling | Jan. 1, 1957 |
| 2,782,982 | Merz | Feb. 26, 1957 |
| 2,984,087 | Folsom | May 16, 1961 |